United States Patent Office 2,976,281
Patented Mar. 21, 1961

2,976,281

N-SUBSTITUTED IMINOSTILBENES

Walter Schindler, Riehen, near Basel, Switzerland, assignor to Geigy Chemical Corporation, Ardsley, N.Y., a corporation of Delaware No Drawing. Filed Dec. 11, 1958, Ser. No. 779,560

Claims priority, application Switzerland Dec. 20, 1957

6 Claims. (Cl. 260—239)

The present invention concerns new N-heterocyclic compounds having valuable pharmacological properties, as well as a process for the production thereof.

N-substituted azepines of the general formula

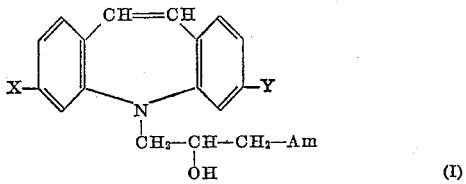

wherein X and Y represent hydrogen or halogen atoms, and Am represents a low molecular dialkylamino radical, of which both alkyl radicals can also be bound to each other direct or by way of an oxygen atom, as well as the salts and quaternary ammonium compounds thereof, have not been known up to now.

It has now been found that these compounds have valuable pharmacological properties, in particular spasmolytic, anti-allergic and hypnotic activity. In addition, they can be used to potentiate the effect of medicaments as well as for the treatment of nervous disorders, in particular in cases of depression.

The new compounds according to the present invention can be produced by reacting a 5-(2'.3'-epoxy-propyl)-azepine of the general formula

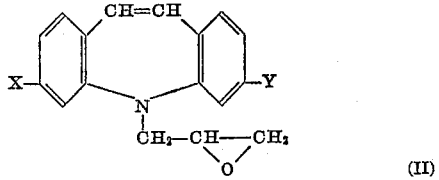

with a secondary amine of the general formula

H—Am        (III)

wherein X, Y and Am have the meanings given above, and, if desired, converting the reaction products obtained, into their salts by treatment with inorganic or organic acids, or into the quatenary ammonium compounds by reaction with reactive esters of aliphatic or araliphatic alcohols.

The reactions of the epoxypropyl compounds with the secondary amines can be performed in the presence or absence of solvents or diluents. For example, an excess of the secondary amine used in the reaction can be used as diluent and, in this case, the reaction is performed, for example, at the boiling temperature of the amine under normal pressure. The reaction can also be performed by heating the components in an inert solvent such as e.g. benzene, toluene or xylene or also ethanol or methanol. In particular, using easily volatile amines such as e.g. dimethylamine, the components in a suitable inert solvent can be reacted in the autoclave.

The starting materials of the general Formula II can be obtained from 5-dibenzo[b.f]azepine, referred to in the following as iminostilbene, or the C-substitution products thereof by reacting their alkali metal compounds, in particular their sodium compounds, with epichlorohydrin. The iminostilbene and C-substitution products thereof are obtained from 10.11-dihydro-5-dibenzo[b.f] azepine (iminobenzyl) or the C-substitution products thereof by N-acylation, bromination in the 10-position with bromosuccinimide and successive or simultaneous splitting off of hydrogen bromide and hydrolysis, for example by means of alkali lyes. Suitable starting materials of the general Formula II are, for example, 5-(2'.3'-epoxy-propyl)-iminostilbene and 5-(2'.3'-epoxy-propyl)-3.7-dichloro-iminostilbene. These epoxypropyl compounds can be reacted with dimethylamine, methylethylamine, diethylamine, di-n-propylamine, methyl-n-propylamine, methyl-isopropylamine, ethyl-n-propylamine, methyl-n-butylamine, di-isobutylamine, pyrrolidine, piperidine and morpholine.

The tertiary bases form salts, some of which are water soluble, with inorganic or oragnic acids such as hydrochloric acid, hydrobromic acid, sulphuric acid, phosphoric acid, methane sulphonic acid, ethane disulphonic acid, acetic acid, succinic acid, fumaric acid, maleic acid, maleic acid, tartaric acid, citric acid, benzoic acid and phthalic acid.

On reacting with reactive esters, in particular with halides or sulphates of aliphatic or araliphatic alcohols, for example methyl iodide, dimethyl sulphate, ethyl bromide, ethyl iodide, diethyl sulphate, n-propyl bromide, n-butyl bromide, allyl bromide, allyl iodide, benzyl chloride, benzyl bromide or p-chlorobenzyl chloride, monoquaternary ammonium compounds are formed from the tertiary amines of the general Formula I whereby the aliphatically bound nitrogen atom reacts.

The compounds according to the present invention when used as mental drugs, may be administered perorally in doses of 25 mg. five to ten times daily for adults. The same dosage may also be administered parenterally, e.g. intramuscularly.

The following examples further illustrate the production of the new compounds. Parts are given as parts by weight and their relationship to parts by volume is as that of grammes to cubic centimetres. The temperatures are in degrees centigrade.

*Example 1*

38.6 parts of iminostilbene are dissolved while warming in 400 parts by volume of abs. benzene and 20 parts of epichlorohydrin are added. A suspension of 8 parts of sodium amide in toluene is then added dropwise at 50–60° while stirring well, the addition being made within half an hour. The reaction mixture is then boiled for 2 hours under a reflux, cooled and the solvents are removed in the vacuum. Water is added to the residue and it is thoroughly extracted with ether. The ethereal solution is thoroughly washed with water, dried with sodium sulphate and concentrated. On distilling the residue in a high vacuum from a Hickman flask, 5-(2'.3'-epoxy-propyl)-iminostilbene passes over at 150–160° under 0.02 mm. pressure.

24.9 parts of 5-(2'.3'-epoxy-propyl)-iminostilbene are boiled under reflux for 16 hours with 75 parts of pure diethylamine. The excess diethylamine is then distilled off in the vacuum and the residue is taken up in ether. The basic portions are removed from the ethereal solution with 30% acetic acid, the acetic acid solution is made alkaline with concentrated caustic soda lye and the oil which precipitates is taken up in petroleum ether. After drying, the solution is concentrated to a small volume whereupon the 5-(3'-diethylamino-2'-hydroxy-propyl)-iminostilbene crystallises out. M.P. 105–106°.

On heating this iminostilbene derivative in abs. ethyl acetate with one molar equivalent of dimethyl sulphate, 5-(3'diethylamino-2'-hydroxypropyl)-iminostilbene methyl sulphate is obtained.

On the addition of abs. alcoholic hydrochloric acid to the ethereal solution of the above iminostilbene derivative, the hydrochloride of this compound precipitates. It is recrystallised from alcohol/ether.

5 - (3' - diethylamino - 2' - hydroxypropyl) - 3.7 - dichloro-iminostilbene, the hydrochloride of which melts at 268–270°, and 5-(3'-diethylamino-2'-hydroxypropyl)-3.7-dibromo-iminostilbene are obtained in an analogous manner.

*Example 2*

24.9 parts of the 5-(2'.3'-epoxy-propyl)-iminostilbene obtained according to Example 1 are boiled under reflux with 50 parts by volume of piperidine for 16 hours. The reaction mixture is then poured into water and thoroughly extracted with ether. The ethereal solution is then extracted with 2 N-hydrochloric acid and the basic portions in the extract are again precipitated by making the reaction alkaline with concentrated caustic soda lye. The basic portions are taken up in ether; the ether solution is dried over sodium sulphate and evaporated. On distilling the residue in the high vacuum, 5-(3'-piperidino-2'-hydroxy-propyl)-iminostilbene is obtained. $B.P._{0.002}$ 186–188°.

5 - (3'-pyrrolidino - 2'-hydroxypropyl)-iminostilbene, ($B.P._{0.002}$ 185°) is obtained in an analogous manner on using 50 parts of pyrrolidine instead of piperidine.

Also 5 - (3' - morpholino - 2' - hydroxypropyl)-iminostilbene is obtained in an analogous manner.

What I claim is:

1. 5 - (3' - diethylamino - 2' - hydroxypropyl) - iminostilbene.
2. 5 - (3' - diethylamino - 2' - hydroxypropyl) - 3.7-dichloro-iminostilbene.
3. 5 - (3' - piperidino - 2' - hydroxypropyl) - iminostilbene.
4. 5 - (3' - pyrrolidino - 2' - hydroxypropyl) - iminostilbene.
5. 5 - (3' - morpholino - 2' - hydroxypropyl) - iminostilbene.
6. 5 - [3' - di(lower)alkylamino - 2' - hydroxypropyl]-iminostilbene.

References Cited in the file of this patent
UNITED STATES PATENTS 2,674,596     Hafliger et al. _____ Apr. 6. 1954